US008418193B2

(12) United States Patent
Saito et al.

(10) Patent No.: US 8,418,193 B2
(45) Date of Patent: Apr. 9, 2013

(54) INFORMATION PROCESSING TERMINAL, INFORMATION PROCESSING METHOD, AND PROGRAM

(75) Inventors: Mari Saito, Kanagawa (JP); Noriyuki Yamamoto, Kanagawa (JP); Mitsuhiro Miyazaki, Kanagawa (JP); Yasuharu Asano, Kanagawa (JP); Tatsuki Kashitani, Kanagawa (JP)

(73) Assignee: Sony Corporation, Tokyo (JP)

( * ) Notice: Subject to any disclaimer, the term of this patent is extended or adjusted under 35 U.S.C. 154(b) by 1137 days.

(21) Appl. No.: 12/325,509

(22) Filed: Dec. 1, 2008

(65) Prior Publication Data

US 2009/0089833 A1 Apr. 2, 2009

(30) Foreign Application Priority Data

Mar. 12, 2007 (JP) ................................ P2007-312031

(51) Int. Cl.
*H04N 5/76* (2006.01)
*H04N 7/16* (2011.01)

(52) U.S. Cl.
USPC ................................................ 725/12; 725/46

(58) Field of Classification Search ................. 725/9-12
See application file for complete search history.

(56) References Cited

U.S. PATENT DOCUMENTS 5,774,591 A * 6/1998 Black et al. .................. 382/236
6,585,521 B1 * 7/2003 Obrador ....................... 434/236
7,721,310 B2 * 5/2010 Schaffer et al. ................. 725/46
8,079,054 B1 * 12/2011 Dhawan et al. ............... 725/105
2003/0093784 A1 * 5/2003 Dimitrova et al. .............. 725/10
2004/0013398 A1 * 1/2004 Miura et al. .................... 386/46
2006/0143647 A1 * 6/2006 Bill ................................ 725/10

OTHER PUBLICATIONS

Paul Resnick et al., "GroupLens An Open Architecture for Collaborative Filtering of Netnews", Proceedings of ACM 1994 Conference on Computer Supported Cooperative Work, Chapel Hill, NC: pp. 175-186, 1994, Association for Computing Machinery.

* cited by examiner

*Primary Examiner* — Vivek Srivastava
*Assistant Examiner* — Carmine Malangone
(74) *Attorney, Agent, or Firm* — Finnegan, Henderson, Farabow, Garrett & Dunner, L.L.P.

(57) ABSTRACT

An information processing method includes the steps of: obtaining biometric information expressing biometric responses exhibited by a user during content playback; obtaining metadata for each content of which biometric information is obtained; identifying attributes linked to the biometric information within the attributes included in the obtained metadata and identifying, in the case of content wherein identified attribute values differ but the user exhibits similar biometric responses during playback, the different value of the attribute linked to the biometric information as a value not necessary to be distinguished; reconfiguring a profile by merging the information relating to the value which is identified which is not necessary to be distinguished, from the information included in the user profile; identifying recommended content based on the reconfigured profile; and presenting the identified recommended content information to the user.

4 Claims, 19 Drawing Sheets

FIG. 5

| | USER 1 | USER 2 | USER 3 |
|---|---|---|---|
| CONTENT A | ○ | ○ | ○ |
| CONTENT B | | | |
| CONTENT C | | × | |
| CONTENT D | | ○ | |
| CONTENT E | ○ | ○ | ○ |
| CONTENT F | | | ○ |
| CONTENT G | | | ○ |

FIG. 20

| | GENRE | WITH/WITHOUT LYRICS | SPEED |
|---|---|---|---|
| CONTENT A | COUNTRY | ○ | FAST |
| CONTENT B | COUNTRY | | MEDIUM |
| CONTENT C | JAZZ | ○ | SLOW |
| CONTENT D | POP | ○ | SLOW |
| CONTENT E | POP | | MEDIUM |
| CONTENT F | CLASSICAL | ○ | FAST |

INFORMATION PROCESSING TERMINAL, INFORMATION PROCESSING METHOD, AND PROGRAM

CROSS REFERENCES TO RELATED APPLICATIONS

The present invention contains subject matter related to Japanese Patent Application JP 2007-312031 filed in the Japanese Patent Office on Dec. 3, 2007, the entire contents of which are incorporated herein by reference.

BACKGROUND OF THE INVENTION

1. Field of the Invention

The present invention relates to an information processing terminal, information processing method, and program, and particularly relates to an information processing terminal, information processing method, and program wherein content recommendation can be more appropriately performed based on biometric information.

2. Description of the Related Art

There is a technique wherein, based on purchasing history and activity history of multiple users, other users exhibiting reactions similar to the target user can be identified, and from the identified other user histories, content which the target user has not experienced can be recommended to the target user. Such a technique is called Collaborative Filtering (See P. Resnick, N. Iacovou, M. Suchak, P. Bergstrom, and J. Reid, 1. "Group Lens?: Open Architecture for Collaborative Filtering of Netnews" Conference on Computer Supported Cooperative Work, pp. 175-186, 1994). Thus, a target user can receive recommendations for content that the target user himself has not viewed or listened to, and that other users exhibiting similar reactions to have purchased and evaluated highly.

SUMMARY OF THE INVENTION

Collaborative filtering is effective for decision-making by a user such as for product purchases, but is not necessarily effective for recommending an item such as content, of which the reaction of the user using such item changes in a time-series manner.

For example, the reaction of another user serving as a standard when selecting recommended content is a finalized reaction as to the content such as "like", "neither like nor dislike", and "dislike", and how the finalized reaction to the content is reached, such as which portion of the content is liked and which portion is disliked, is not taken into consideration. Likes/dislikes can be consciously evaluated, but specifically verbalizing the reason for the likes/dislikes based on how one is feeling is difficult.

On the other hand, there is a technique to estimate the feelings of a user based on biometric information obtained by measuring the state of brain waves or measuring the state of sweating. In the case of applying this technique for content recommendation, an arrangement may be made wherein the biometric information is actually measured during viewing/listening to content and feelings estimated, and recommending content with past indications of feelings similar to the estimated feelings, but in this case, identifying and recommending unknown content that the user is likely to find interesting cannot be performed.

There has been recognized the demand to enable more appropriately performing content recommendation based on the biometric information.

According to an embodiment of the present invention, an information terminal includes: a biometric information obtaining unit configured to obtain biometric information expressing biometric responses exhibited by a user during content playback; a metadata obtaining unit configured to obtain metadata for each content of which biometric information is obtained by the biometric information obtaining unit; a identifying unit configured to identify attributes linked to the biometric information within the attributes included in the metadata obtained by the metadata obtaining unit and identify, in the case of content wherein identified attribute values differ but the user exhibits similar biometric responses during playback, the different value of the attribute linked to the biometric information as a value not necessary to be distinguished; a profile managing unit configured to merge the information relating to the value which is identified by the identifying unit and which is not necessary to be distinguished, from the information included in the user profile, to reconfigure the profile; a recommended content identifying unit configured to identify recommended content based on the profile reconfigured by the profile managing unit; and a recommending unit configured to present the recommended content information identified by the recommended content identifying unit to the user.

According to an embodiment of the present invention, an information processing method or program includes the steps of: obtaining biometric information expressing biometric responses exhibited by a user during content playback; obtaining metadata for each content of which biometric information is obtained; identifying attributes linked to the biometric information within the attributes included in the obtained metadata and identifying, in the case of content wherein identified attribute values differ but the user exhibits similar biometric responses during playback, the different value of the attribute linked to the biometric information as a value not necessary to be distinguished; reconfiguring a profile by merging the information relating to the value which is identified which is not necessary to be distinguished, from the information included in the user profile; identifying recommended content based on the reconfigured profile; and presenting the identified recommended content information to the user.

With the above configuration, biometric information expressing biometric responses exhibited by a user during content playback is obtained, and metadata for each content of which biometric information is obtained is obtained. Also, within the attributes included in the obtained metadata, attributes linked to the biometric information is identified, and in the case of content wherein identified attribute values differ but the user exhibits similar biometric responses during playback, the different value of the attribute linked to the biometric information is identified as a value not necessary to be distinguished. Further, from the information included in the user profile the information relating to the value which is identified which is not necessary to be distinguished is merged to reconfigure the profile, based on the reconfigured profile the recommended content is identified, and the identified recommended content information is presented to the user.

With the above configuration, content recommendation can be more appropriately performed based on biometric information.

BRIEF DESCRIPTION OF THE DRAWINGS

FIG. 5 is a diagram illustrating an example of user evaluation as to content and viewing/listening history;

FIG. 20 is a diagram illustrating an example of metadata;

DESCRIPTION OF THE PREFERRED EMBODIMENTS

Figure 1:
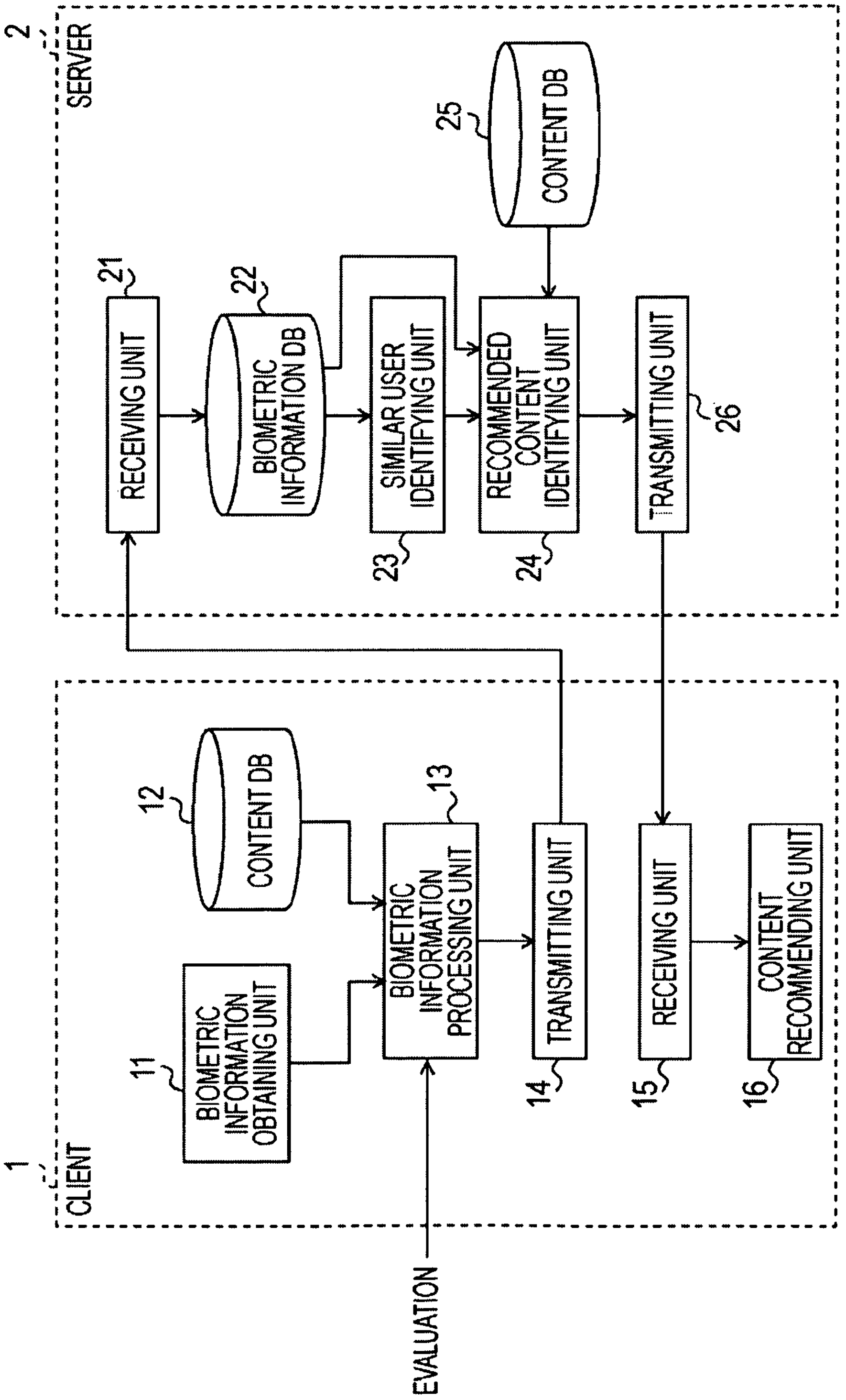
FIG. 1 is a block diagram illustrating a configuration example of a content recommending system according to an embodiment of the present invention.

FIG. 1 is a block diagram illustrating a configuration example of a content recommending system relating to an embodiment of the present invention. As shown in FIG. 1, the content recommending system is configured by a client 1 and server 2 being connected via a network such as the Internet.

The client 1 is made up of a biometric information obtaining unit 11, content database 12, biometric information processing unit 13, transmitting unit 14, receiving unit 15, and content recommending unit 16. On the other hand, the server 2 is made up of a receiving unit 21, biometric information database 22, similar user identifying unit 23, recommended content identifying unit 24, content database 25, and transmitting unit 26.

As described later, with the server 2, an arrangement is made wherein a user exhibiting similar biometric responses during content playback is identified, and content which the user of the client 1 has not experienced and which obtains high evaluation by other users exhibiting similar biometric responses as the user of client 1 is recommended as to a user of client 1 receiving a recommendation. That is to say, the server 2 is a device to perform content recommendation by collaborative filtering. The server 2 is connected to multiple terminals having similar configuration as the client 1, besides the client 1, via a network.

Biometric responses here include the amount of hemoglobin included in the blood, blood flow amount, sweat amount, pulse, and so forth. Any biometric responses may be used as long as the response can be exhibited by a user viewing/listening to content.

The biometric information obtaining unit 11 of the client 1 detects the biometric responses of the user viewing/listening to content during content playback, and obtains biometric information which is time-series data of the detected biometric responses. Biometric information includes information expressing during which content playback the information is obtained.

Figure 2:
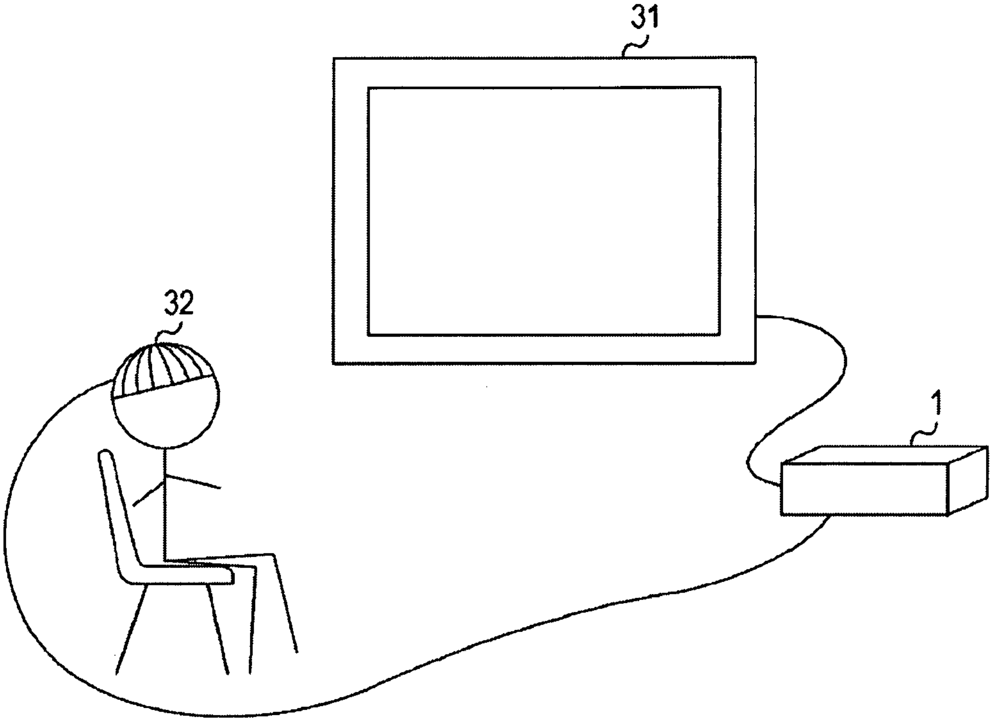
FIG. 2 is a diagram illustrating a state during content playback.

FIG. 2 is a diagram showing a state during content playback. In the example in FIG. 2, a television receiving 31 and head gear 32 are connected to the client 1. The head gear 32 is mounted on the head of the user of client 1 who is sitting in a chair forward of the television receiver 31 and is viewing/listening to the content.

A content picture played back with the client 1 is displayed on the television receiver 31, and the content audio is output from the speaker of the television receiver 31.

During content playback, with the headgear 32, near-infrared light is irradiated as to various portions of the head of the user, and measuring the amount of hemoglobin which responds to oxygen consumption that happens when the brain has activity as a biometric response is performed. A signal expressing measured biometric response is supplied from the head gear 32 to the client 1, and the biometric information is obtained from the biometric information obtaining unit 11.

FIG. 2 shows an example in the case of using the amount of hemoglobin included in the blood as a biometric response. Similar to the case of using other responses as biometric responses, the measuring device is mounted on the user viewing/listening to the content.

Figure 3:
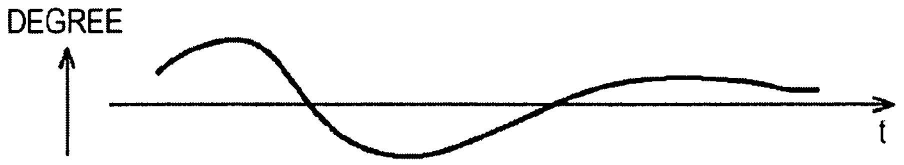
FIG. 3 is a diagram illustrating an example of time-series data of a biometric response.

FIG. 3 is a diagram showing an example of time-series data of a biometric response. As shown in FIG. 3, the biometric response is obtained as time-series data. The horizontal axis in FIG. 3 represents point-in-time, and the vertical axis represents degree (in the case of the example described above, the amount of hemoglobin included in the blood).

The biometric information obtaining unit 11 outputs the biometric information thus obtained to the biometric information processing unit 13. Multiple contents are played back with the client 1, and for every content played back, biometric information which is time-series data as shown in FIG. 3 is obtained. The biometric information processing unit 13 reads out and plays back the content stored in the content database 12, and outputs the content pictures and audio to the television receiver 31. The biometric information processing unit 13 obtains biometric information sequentially supplied from the biometric information obtaining unit 11 during content playback.

Also, the biometric information processing unit 13 obtains user evaluation as to the content. For example, upon the playback of one content ending, evaluation input is requested as to the user. The user inputs an evaluation by operating a remote controller or mouse or the like. The biometric information processing unit 13 outputs the biometric information supplied from the biometric information obtaining unit 11 and the information expressing evaluation as to each content and viewing/listening history of the user to the transmitting unit 14.

The transmitting unit 14 transmits the information supplied from the biometric information processing unit 13 to the server 2. The biometric information and evaluation is provided to the server 2 for each content, for all of the contents which the user of the client 1 has experienced.

The receiving unit 15 receives the recommended content information transmitted from the server 2, and outputs the received information to the content recommending unit 16.

The content recommending unit 16 displays the recommended content information identified by the server 2 on the television receiver 31, based on the information supplied from the receiving unit 15, and provides this to the user. Recommended content information is displayed for example as the title, sales source, overview and so forth of the recommended content.

The receiving unit 21 of the server 2 receives the biometric information transmitted from the transmitting unit 14 of the client 1 and the information expressing user evaluation of each content and viewing/listening history of the user, and stores the received information in the biometric information database 22.

As described above, multiple terminals having similar configuration as the client 1 are connected to the server 2. Similar information is transmitted from each of the terminals, whereby the biometric information of each user and the content evaluations and viewing/listening history information are stored in the biometric information database 22.

The similar user identifying unit 23 reads out biometric information from the biometric information database 22, and based on patterns of time-series data of the biometric responses of each user, identifies users exhibiting similar biometric responses during viewing/listening to the same content.

Whether or not the pattern of time-series data of the biometric responses are similar is determined, for example, by finding a correlation between patterns in time-series data of biometric responses for each user, or finding the rate of matching with a specific pattern, or finding the rate of matching as to a threshold of a specific portion (range).

Figure 4:
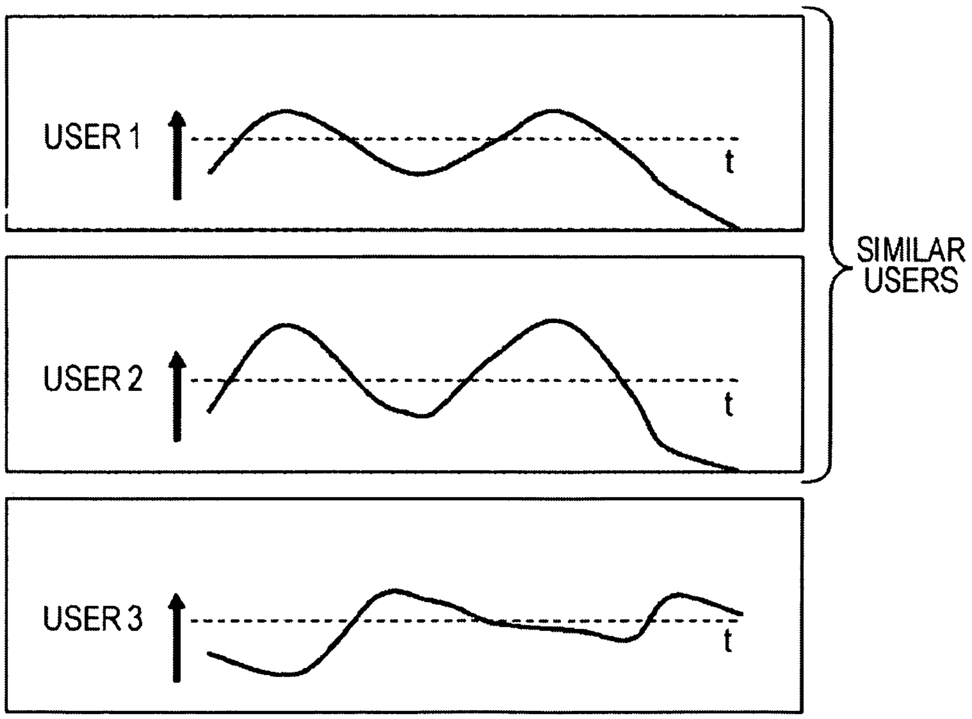
FIG. 4 is a diagram illustrating an example of biometric information.

FIG. 4 is a diagram showing an example of biometric information as to the content A. With the example in FIG. 4, the time-series data patterns of biometric responses obtained when the users 1 through 3 are each viewing/listening to content A are shown in sequence from the top.

In the case that the time-series data patterns of biometric responses of the users 1 through 3 as to the content A are as those shown in FIG. 4, the time series data pattern of the biometric responses of user 1 and the time series data pattern of the biometric responses of user 2 are similar, so the users 1 and 2 are similar users which are users exhibiting similar biometric responses when viewing/listening to content A.

During viewing/listening to content A, the users 1 and 2 exhibit biometric responses at similar portions and to similar degrees. On the other hand, the users 1 and 3 are not similar users, so the users 1 and 3 exhibit biometric responses at different portions or to different degrees during viewing/listening to content A.

The above-described biometric response of the amount of hemoglobin in the blood indicate a state of brain activity, and since the state of activity likely differs based on the feelings while viewing/listening to the content, the similar users are users having similar feelings (responses) as to a certain content, i.e. indicate that the similar users are users viewing/listening in a similar manner. The manner of viewing/listening differs by person for the same content, such as having a manner of viewing so as to subconsciously respond to a certain brightness of a picture, or a manner of listening so as to subconsciously respond to a sound of a certain frequency.

Note that an arrangement may be made wherein determination is not made based on time-series data patterns of biometric responses as to one content, but determination is made as to whether or not the users are similar users based on the time-series data patterns of biometric responses as to multiple contents.

The similar user identifying unit 23 outputs the similar user information thus identified to the recommended content identifying unit 24.

The recommended content identifying unit 24 references each user evaluation and viewing/listening history expressed with the information stored in the biometric information database 22, and identifies content which the user of the client 1 has not experienced, and which similar users to the user of the client 1 have given high evaluations, as the recommended content. Identifying of the recommended content is performed for example when content recommendation is requested from the client 1 at a predetermined timing.

FIG. 5 is a diagram showing an example of user evaluation and viewing/listening history. With the example in FIG. 5, the evaluations of users 1 through 3 as to contents A through G and the viewing history thereof are shown. Let us say that the user 1 is the user of the client 1. In FIG. 5, a circle indicates that viewing/listening has been finished and there is a high evaluation, and an X indicates that viewing/listening has been finished but there is not a high evaluation. An empty cell indicates untried content of which the user has not performed viewing/listening.

For example, the user 1 has viewed/listened to contents A and E, and has given high evaluations as to both of the contents. The user 2 has viewed/listened to contents A, C, D, and E, and has given high evaluations as to the contents A, D, and E, and has given a low evaluation as to content C. The user 3 has viewed/listened to contents A, E, F, and G, and has given high evaluations as to all of the contents.

In the case that such evaluations and viewing/listening is obtained, a similar user of the user 1 which is a user of the client 1 is identified with the recommended content identifying unit 24 as a user 2 based on information supplied from the similar user identifying unit 23 (FIG. 4).

Also, content D which is a content that the user 1 has not experienced and that user 2 who is a similar user has given a high evaluation is identified as recommended content.

Even if the content is not experienced by the user 1, content C which is content that user 2 has given a low evaluation, or contents F and G which are contents that user 3 who is not a similar user to user 1 has given high evaluations, are not selected as recommended contents.

The recommended content identifying unit 24 reads out information such as title, sales source, overview and so forth of the recommended content, and upon reading out, the information thereof is output to the transmitting unit 26. Various types of information relating to the content are stored in the content database 25. The transmitting unit 26 transmits the information supplied from the recommended content identifying unit 24 to the client 1.

Figure 6:
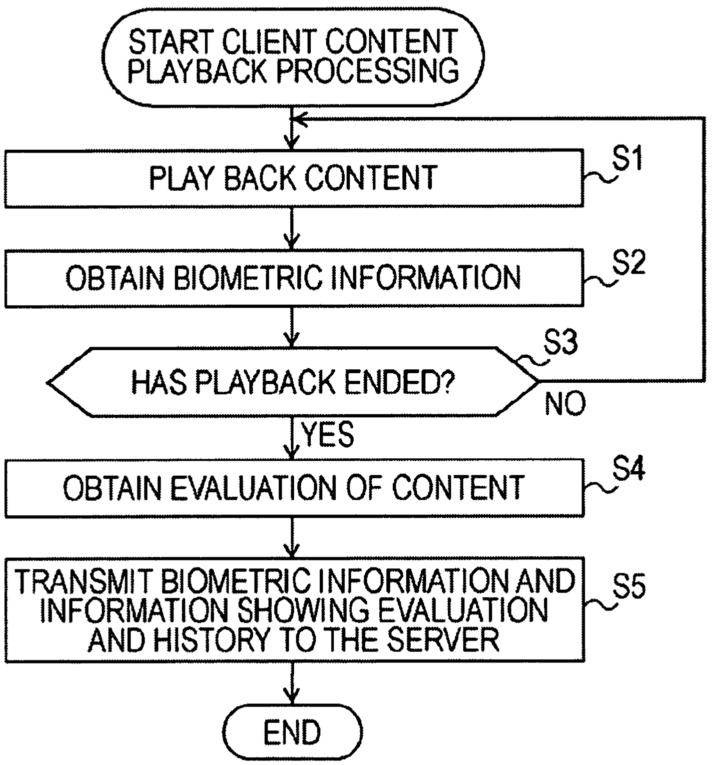
FIG. 6 is a flowchart describing content playback processing of a client.

Processing of the client 1 and server 2 having the above-described configuration will be described. First, processing of the client 1 playing back the content will be described with reference to the flowchart in FIG. 6. This processing is started, for example, upon playback of predetermined content being instructed by the user.

In step S1, the biometric information processing unit 13 of the client 1 plays back the content read out from the content database 12.

In step S2, the biometric information obtaining unit 11 obtains biometric information which is time-series data of the biometric responses of the user viewing/listening to the content, based on output from a measuring device mounted on the user, an outputs this to the biometric information processing unit 13.

In step S3, the biometric information processing unit 13 determines whether or not the content playback has ended, in the case determination is made of not ended, the flow is returned to step S1, and the above processing is repeated.

On the other hand, in the case determination is made in step S3 that the content playback has ended, in step S4 the biometric information processing unit 13 obtains user evaluation as to the played-back content. The biometric information processing unit 13 outputs the biometric information and the information expressing evaluations as to the content and the viewing/listening history of the user to the transmitting unit 14.

In step S5, the transmitting unit 14 transmits the information supplied from the biometric information processing unit 13 to the server 2. After this, the processing is ended.

With the above description, the evaluation as to content is described as a user inputting the evaluation manually, but an arrangement may be made wherein a high evaluation is set as to content subjected to operations likely to indicate high evaluation. For example, a high evaluation may be set as to content that is played back multiple times, content that is set to protect from deletion, and content that has been copied.

Also, an arrangement may be made wherein a high evaluation is set as to content including in metadata the same word as a word such as an actor name input as a keyword by the user to search for content. Various types of metadata such as title, sales source, actors, overview, and so forth are added to each content.

Further, an arrangement may be made wherein, in the case that the user of the client 1 has received content recommendation by the server 2 in the past, the user of the client 1 receives a recommendation, and a high evaluation is set as to content having the same metadata as metadata of the content subjected to purchasing operations or playback operations.

An arrangement may be made wherein a high evaluation is simply set as to content that the user of the client 1 has purchased or the like and holds.

Figure 7:
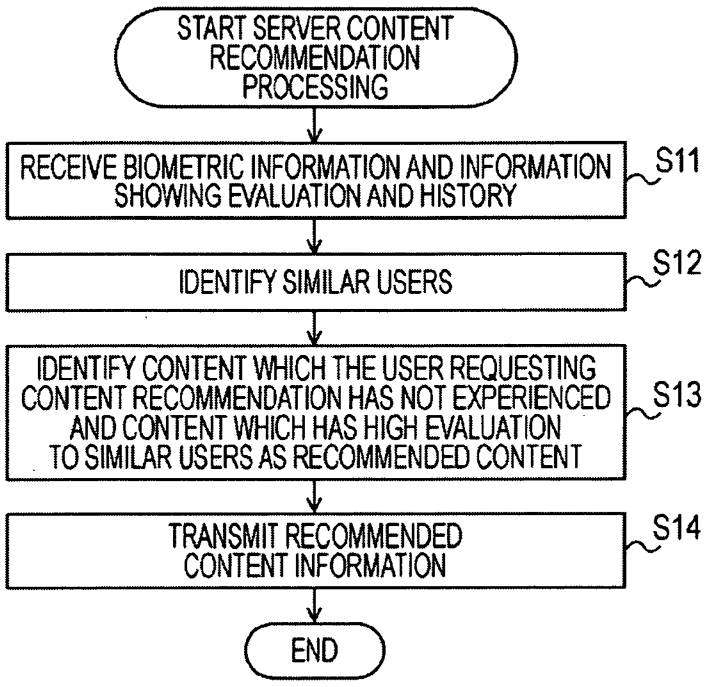
FIG. 7 is a flowchart describing content recommending processing of a server.

Next, processing of the server 2 performing content recommendation will be described with reference to the flowchart in FIG. 7.

In step S11, the receiving unit 21 of the server 2 receives biometric information transmitted from the client 1 and evaluation as to the content and viewing/listening history of the user, and stores the received information in the biometric information database 22.

The processing is performed each time the information is transmitted from the terminals having similar configuration as the client 1, whereby the biometric information of multiple users and evaluations as to the content and viewing/listening history of the users are stored in the biometric information database 22.

In step S12, the similar user identifying unit 23 identifies a similar user based on the biometric information stored in the biometric information database 22. The similar user identifying unit 23 outputs the identified similar user information to the recommended content identifying unit 24.

In step S13, the recommended content identifying unit 24 references the evaluations and viewing/listening history of each user, and identifies content that the user of the client 1 has not experienced and that similar users give a high evaluation as recommended content. The recommended content identifying unit 24 outputs the recommended content information to the transmitting unit 26.

In step S14, the transmitting unit 26 transmits the information supplies from the recommended content identifying unit 24 to the client 1 and ends the processing.

Figure 8:
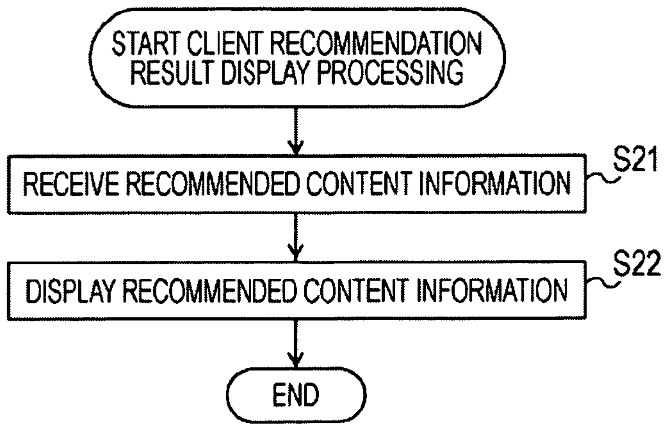
FIG. 8 is a flowchart describing recommendation result display processing of a client.

Next, processing of the client 1 displaying the recommendation results will be described with reference to the flowchart in FIG. 8. This processing is started, for example, upon the recommended content information being transmitted from the server 2 according to a request from the client 1.

In step S21, the receiving unit 15 of the client 1 receives the recommended content information transmitted from the server 2, and outputs the received information to the content recommending unit 16.

In step S22, the content recommending unit 16 displays the recommended content information identified by the server 2 to the television receiver 31, and presents the recommended content to the user. The user can operate a remote controller or the like and download recommended content to purchase, or can view/listen in a streaming form. After this, the processing is ended.

With the above-described processing, the server 2 can perform content recommendation, not with content evaluation that the user consciously performs, but by performing collaborative filtering employing the feelings themselves that the user has as to the content.

Also, the server 2 can use content similarity for recommendation that the user cannot describe, and can provide content recommendation from a viewpoint different from the recommendation of the evaluation base.

With the above description, similar users are identified based on time-series data patterns of the biometric responses, and content that similar users give a high evaluation is identified as recommended content, but an arrangement may be made wherein similar processing is performed based on time-series data patterns of expressions exhibited by the user during content viewing/listening.

"Expression" is a user response which can be externally recognized by picture or sound, such as facial expression such as smiling or frowning, speech such as talking to oneself or holding a conversation, movements such as clapping, rocking, or tapping, or a physical stance such as placing an elbow on the table or the upper body leaning. Expressions can also be considered as responses exhibited by a living user during content viewing/listening, so expression information is also included in the above-described biometric information.

The biometric information obtaining unit 11 of the client 1 detects multiple types of expressions exhibited by the user at predetermined intervals, based on images obtained by photographing the user viewing the content or on audio obtained by collecting the sound of the user listening to the content.

Figure 9:
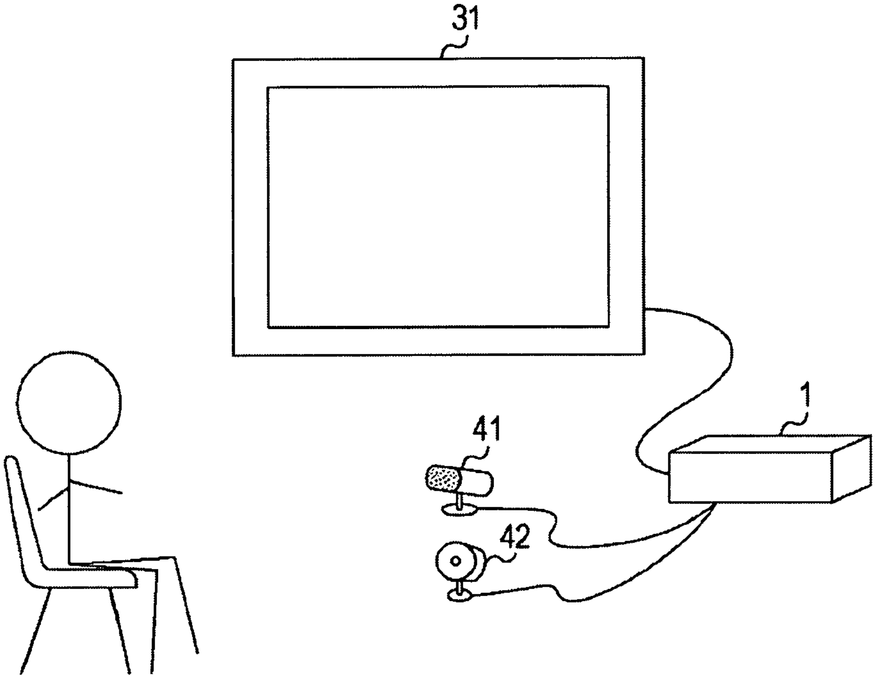
FIG. 9 is a diagram illustrating a state during content playback.

FIG. 9 is a diagram showing a state during content playback. In the example in FIG. 9, besides a television receiver 31, a microphone 41 and camera 42 are connected to the client 1. The directionality of the microphone 41 and the photography range of the camera 42 are facing the user of the client 1 who is forward of the television receiver 31 and is sitting on a certain chair and viewing/listening to the content. The voice of the user collected by the microphone 41 during content playback and the image of the user photographed by the camera 42 is supplied to the client 1.

For example, with the above-described smiling face, the range of the face of the user is detected from the image photographed by the camera 42, and the smiling face is detected by performing matching of the features extracted from the detected face and features of a smiling face prepared beforehand. With the biometric information obtaining unit 11, time-series data showing the timing that the user has a smiling face and the degree of smiling (laughing out loud, grinning, and so forth) is obtained.

Similarly, with the above-described frowning face, the range of the face of the user is detected from the image photographed by the camera 42, and the frowning face is detected by performing matching of the features extracted from the detected face and features of a frowning face prepared beforehand. With the biometric information obtaining unit 11, time-series data showing the timing that the user has a frowning face and the degree of frowning is obtained.

With speech such as talking to oneself or holding a conversation, the speaker is identified by performing speaker recognition subject to the audio collected by the microphone 41, and whether the collected audio is the user of the client 1 speaking to himself or is a conversation with another user viewing/listening to the content together is recognized, whereby the speech is detected. With the biometric information obtaining unit 11, time-series data showing the timing of speech of the user and volume, which is the degree of speech, is obtained.

Clapping is detected based on the sound collected by the microphone 32. With the biometric information obtaining unit 11, time-series data showing the timing of clapping of the user and strength and so forth, which is the degree of clapping, is obtained.

Other expressions also are detected based on data obtained by the microphone 41 and camera 42. The detection of the expression may be arranged such that the data obtained from the microphone 41 and camera 42 is temporarily recorded on a recording medium, then detection performed subject to the recorded data, or may be performed in real-time every time the data is supplied from the microphone 41 and camera 42.

Figure 10:
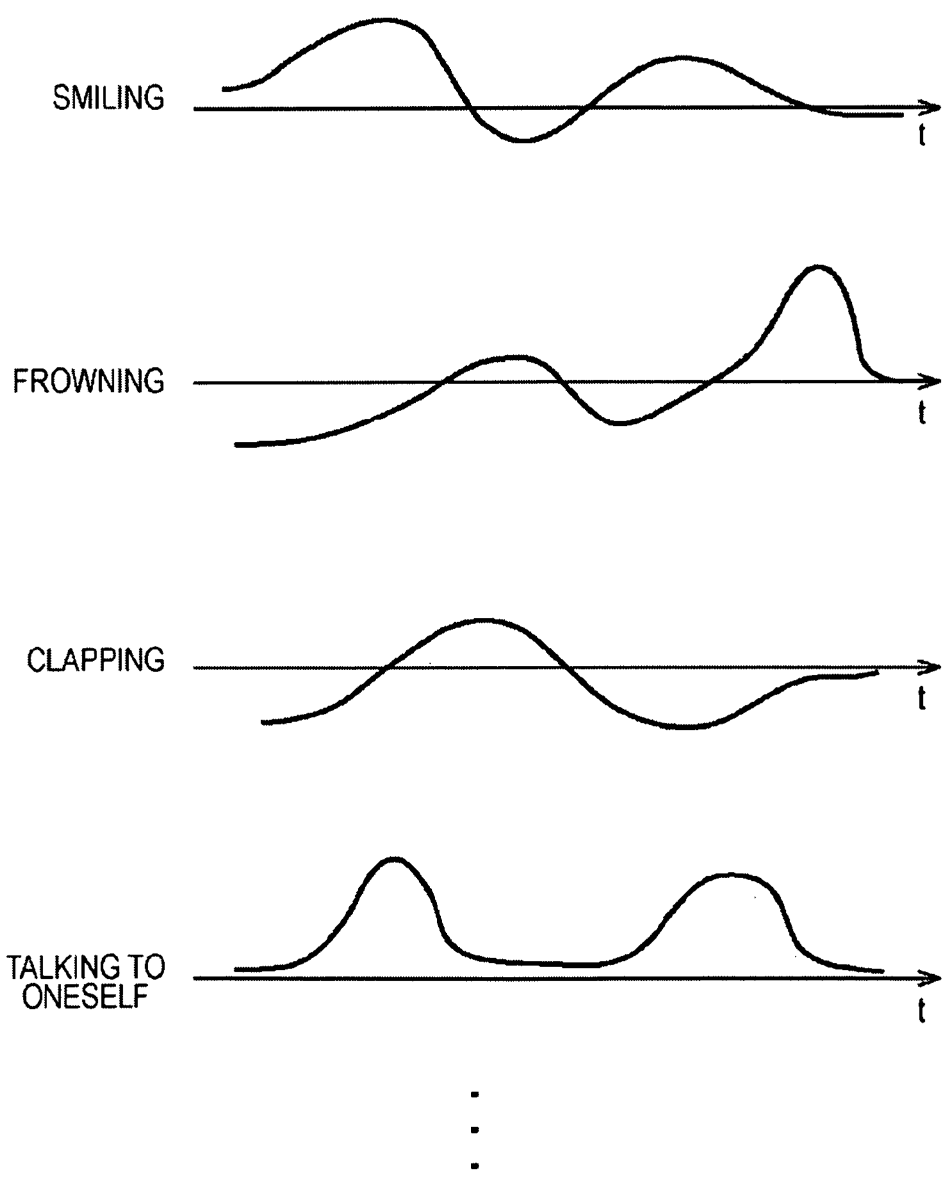
FIG. 10 is a diagram illustrating an example of time-series data of an expression.

FIG. 10 is a diagram illustrating an example of time-series data of expressions. FIG. 10 shows time-series data of smiling, frowning, clapping, and talking to oneself, in order from the top. The horizontal axis indicates time and the vertical axis indicates degree.

The biometric information obtaining unit 11 outputs the time-series data of expressions thus detected to the biometric information processing unit 13. Multiple contents are played back with the client 1, and time-series data such as that shown in FIG. 10 is obtained for each played-back content.

The time-series data of expressions is transmitted from the client 1 to the server 2 along with user evaluation as to the content and viewing/listening history. Expression information is similarly transmitted from other terminals having similar configuration as that of the client 1, whereby expression information of multiple users is collected in the server 2. With the server 2, time-series data patterns of the same types of expressions as to the same content are compared, whereby similar users which are users having similar positions and degrees that the identified expression is detected (time-series data pattern is similar) are identified.

Upon the similar user being identified, content that the user of the client 1 has not experienced and that the similar user has given a high evaluation is identified as recommended content, and the recommended content information is transmitted to the client 1.

Expressions indicating amusement while viewing/listening to content may differ by user, e.g. a certain user may laugh often while viewing/listening to content the user finds amusing, and another user may clap hands often while viewing/listening to content the user finds amusing, whereby using time-series data patterns of expressions also enables identifying a user with a similar viewing/listening manner.

Figure 11:
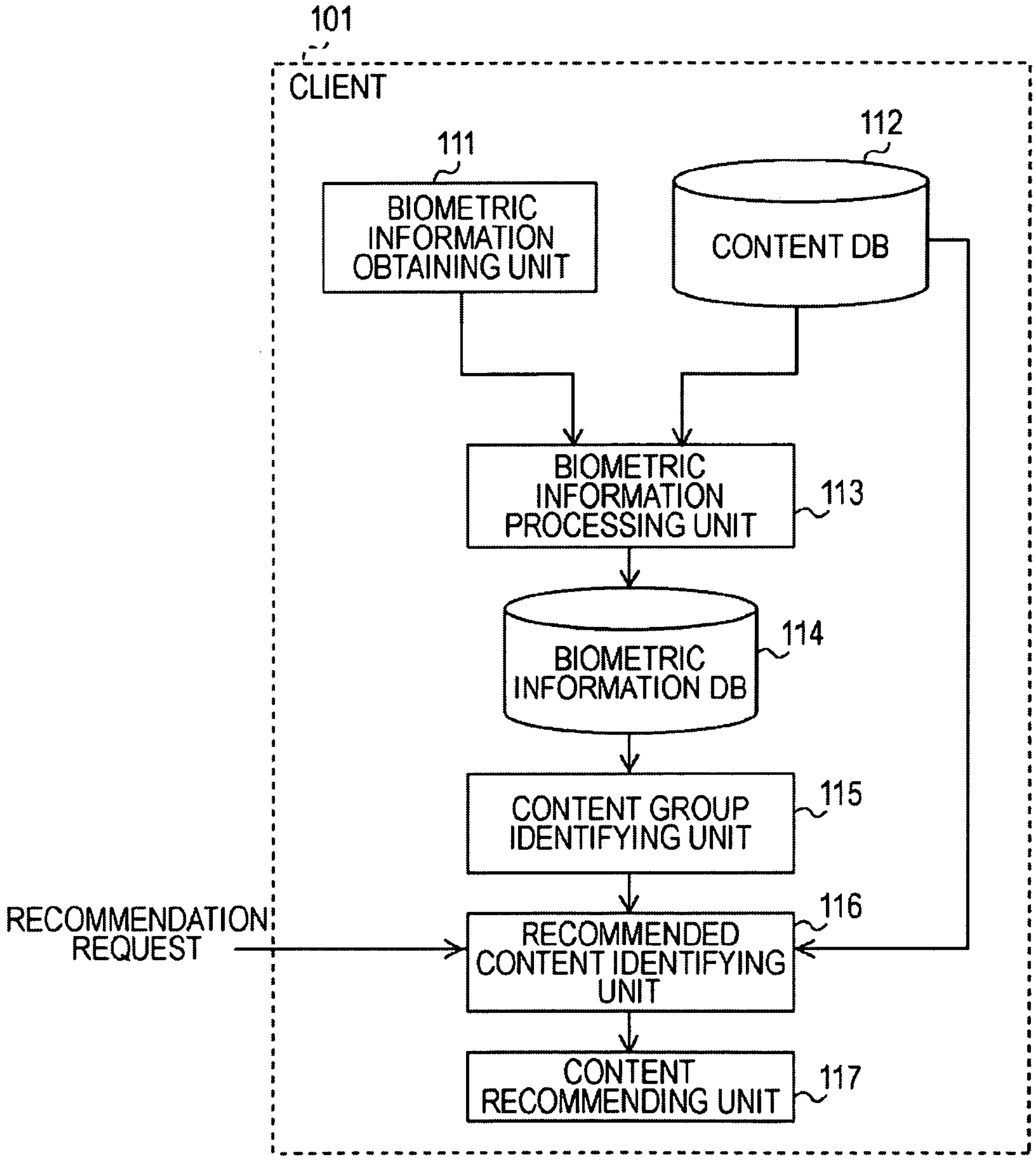
FIG. 11 is a block diagram illustrating a configuration example of a content recommending system according to an embodiment of the present invention.

FIG. 11 is a block diagram showing a configuration example of a content recommending system according to another embodiment of the present invention. As shown in FIG. 11, the content recommending system is realized by the client 101.

The client 101 is made up of a biometric obtaining unit 111, content database 112, biometric information processing unit 113, biometric information database 114, content group identifying unit 115, recommended content identifying unit 116, and content recommending unit 117.

As described later, a content group exhibiting the same biometric responses as the user viewing/listening is identified with the client 101. Also, when content recommendation similar to a certain content is requested, another content belonging to the same group as the content serving as a standard is recommended.

Biometric responses here include the amount of hemoglobin included in the blood, blood flow amount, sweat amount, pulse, and so forth. Any biometric responses may be used as long as the response can be exhibited by a user viewing/listening to content.

The biometric information obtaining unit 111 of the client 101 obtains biometric information which is time-series data of the detected biometric responses of the user viewing/listening to content during content playback, as in a state shown in FIG. 2, and outputs the obtained the biometric information to the biometric information processing unit 113. Biometric information also includes information expressing during which content playback the information is obtained.

Multiple contents are played back with the client 101, and biometric information which is time-series data as shown in FIG. 3 is obtained for each played-back content.

The biometric information processing unit 113 reads out and plays back the content stored in the content database 112. The biometric information processing unit 113 obtains biometric information sequentially supplied from the biometric information obtaining unit 111 during content playback, and stores this in the biometric information database 114. Playback is performed for multiple contents, whereby the biometric information of the user of the client 101 as to each of the played-back content is stored in the biometric information database 114.

The content group identifying unit 115 identifies a group of content which users exhibit similar biometric responses while viewing/listening, based on time-series patterns of biometric responses expressed by the biometric information stored in the biometric information database 114.

Whether or not the pattern of time-series data of the biometric responses are similar or not is determined, for example, by finding a correlation between time-series data patterns, finding the rate of matching with a specific pattern, or finding the rate of matching as to a threshold of a specific portion.

Figure 12:
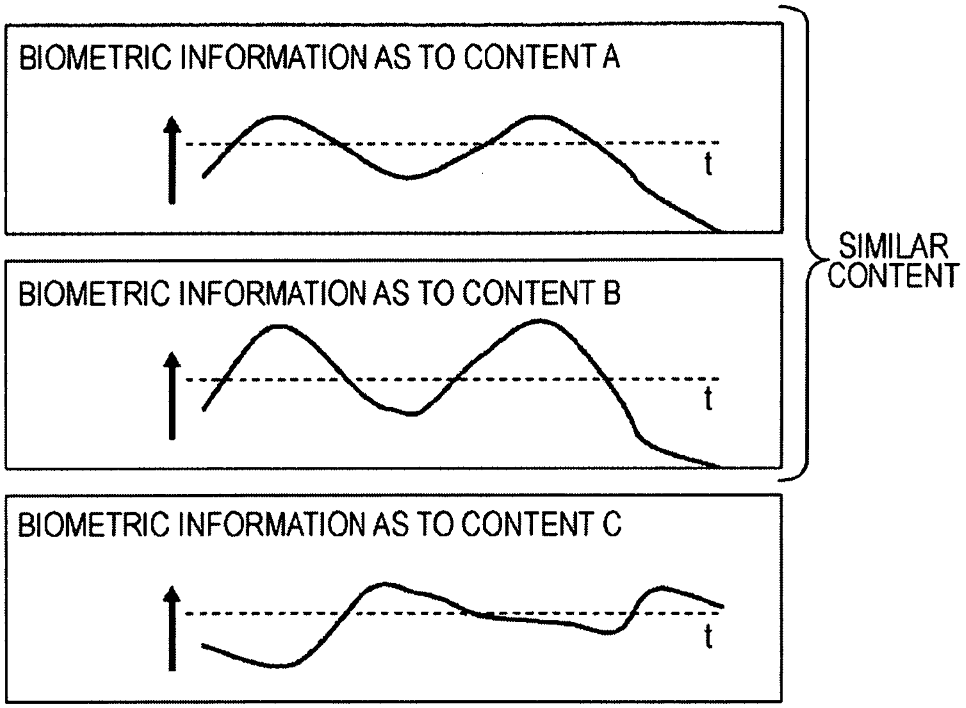
FIG. 12 is a diagram illustrating an example of time-series data of a biometric response.

FIG. 12 is a diagram showing an example of biometric information of the user of the client 1. In the example in FIG. 12, the time-series data patterns of biometric responses as to contents A through C are shown in sequence from the top.

In the case that the time-series data patterns of biometric responses of the user viewing/listening to the contents A through C are as those shown in FIG. 12, the time series data pattern of the biometric responses while viewing/listening to the content A and the time series data pattern of the biometric responses while viewing/listening to the content B are similar, so the contents A and B are a similar content group which is content wherein the user of the client 101 exhibits similar biometric responses while viewing/listening to contents A and B.

The user exhibits similar degrees of biometric responses during a scene having passed a similar amount of time from viewing/listening, while viewing/listening to the content A and while viewing/listening to the content B.

The biometric response of the amount of hemoglobin in the blood as described above indicates a state of brain activity, and the activity state likely differs based on the manner of feeling while viewing/listening to the content, thereby indicating that similar content has similar features at similar timings for each content, i.e. is content that the user has a similar manner of viewing/listening.

The content group identifying unit 115 outputs the information of the similar content group identified as described above to the recommended content identifying unit 116.

Upon a content recommendation being requested by the user, the recommended content identifying unit 116 identifies content belonging to the same similar content group as the standard content as recommended content, based on information supplied from the content group identifying unit 115.

While viewing/listening to a certain content, the user operates a remote controller or mouse or the like to input that the user is searching for content similar to content currently being viewed/listened to, and requests content recommendation as to the client 101. Identifying recommended content is performed with the client 101, with the content the user is viewing/listening to as a standard content.

In the case that a similar content group is identified based on the biometric information as shown in FIG. 12, e.g. when a similar content recommendation is requested during viewing/listening to content B, the content A belonging to the same similar content group as the content B which is the standard is identified as recommended content.

The recommended content identifying unit 116 reads out information such as the title, sales source, overview of the recommended content, and outputs the read out information to the content recommending unit 117.

The content recommending unit 117 displays the recommended content information based on information supplied from the recommended content identifying unit 116 on a television receiver or the like, and presents this to the user.

Figure 13:
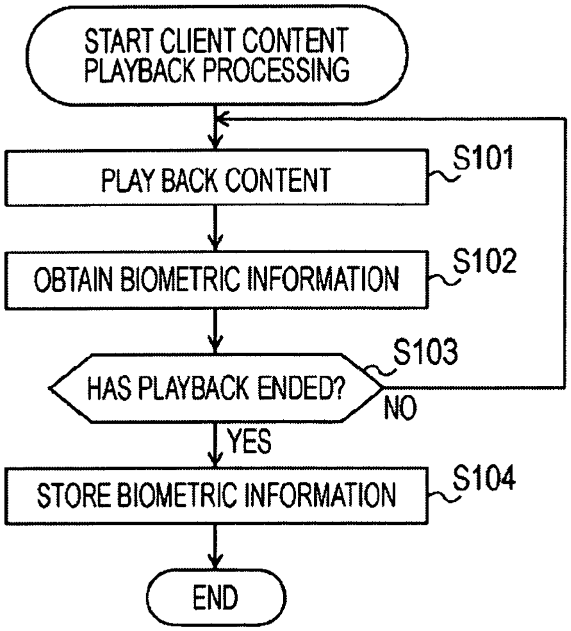
FIG. 13 is a flowchart describing content playback processing of a client.

Processing of the client 101 having a configuration as described above will be described. First, processing of the client 101 playing back the content will be described with reference to flowchart in FIG. 13. This processing is started when playback of a predetermined content is instructed by a user, for example.

In step S101, the biometric information processing unit 113 of the client 101 plays back the content read out from the content database 112.

In step S102, the biometric information obtaining unit 111 obtains biometric information serving as time-series data of the biometric responses of the user viewing/listening to the content, based on the output from the measuring device mounted on the user, and outputs this to the biometric information processing unit 113.

In step S103, the biometric information processing unit 113 determines whether or not the content playback has ended, and in the case determination is made of not ended, the flow is returned to step S101, and the above processing is repeated.

On the other hand, in the case that determination is made in step S103 that the content playback has ended, in step S014, the biometric information processing unit 113 stores the biometric information to the biometric information database 114. After this, the processing is ended.

Next, processing of the client 1 performing content recommendation will be described with reference to the flowchart in FIG. 14.

In step S111, the content group identifying unit 115 identifies a similar content group wherein the users exhibit similar biometric responses during viewing/listening, based on the biometric information stored in the biometric information database 114.

When a content recommendation is requested by the user, in step S112 the recommended content identifying unit 116 identifies a content belonging to the same similar content group as the content serving as a standard as the recommended content.

In step S113, the content recommending unit 117 displays recommended content information, and presents this to the user. After this, the processing is ended.

With the above-described processing, the client 101 identifies recommended content with the manner of viewing/listening of the user as a standard thereof, and can perform content recommendation.

In order to identify a content group wherein the users exhibit similar biometric responses during viewing/listening, and performing content recommendation as described above, the client 101 should cause the users to actually view/listen to a large amount of content and obtain biometric data. For example, in the case that a user has only viewed/listened to three contents, the client 101 can only select recommended content within a range of such three.

An arrangement may be made wherein, in the case that biometric information is insufficient and appropriate recommendations cannot be performed, the biometric information for another user can be obtained from another device, and content recommendations can be performed using the obtained biometric information also.

Figure 15:
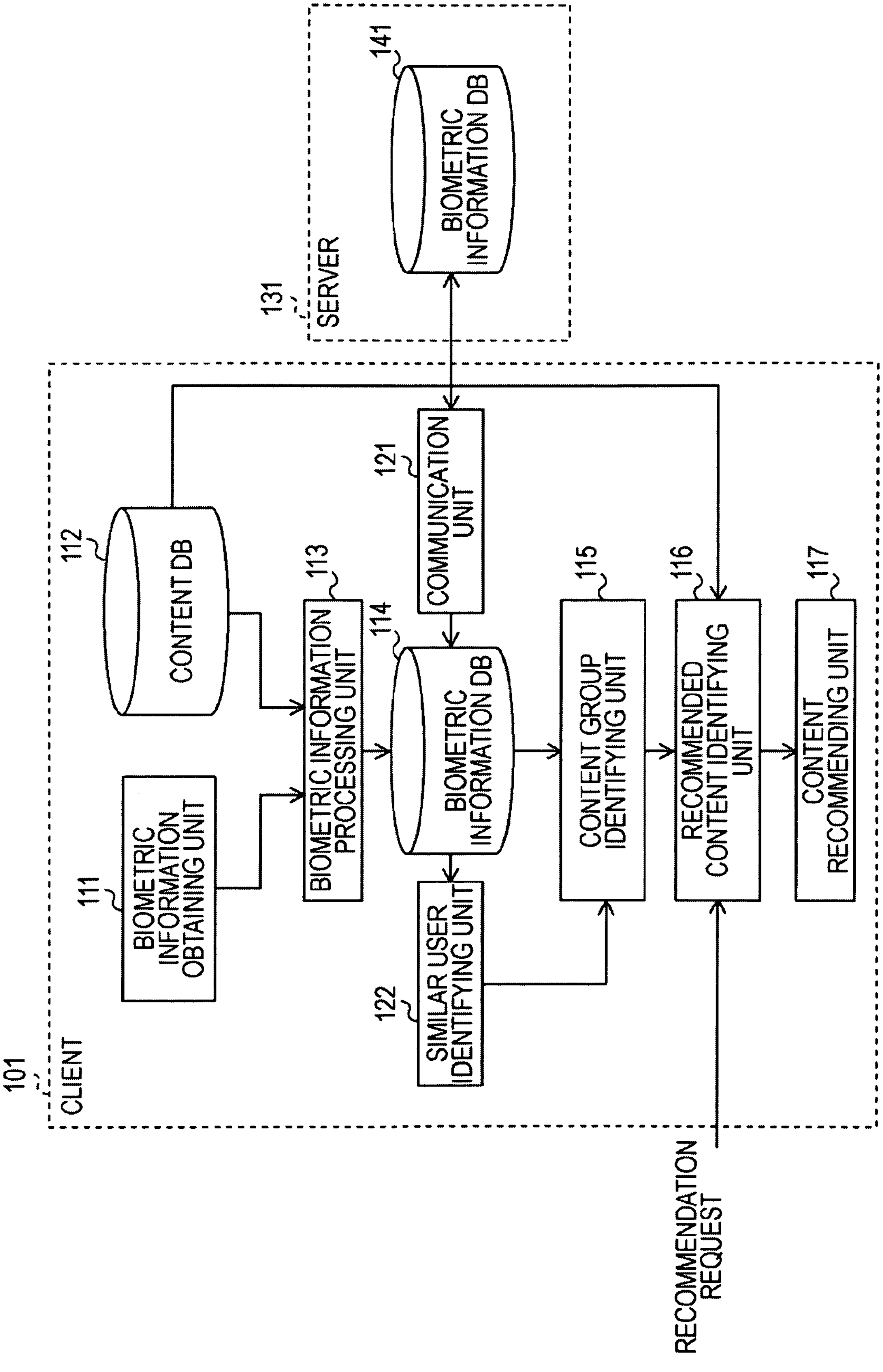
FIG. 15 is a block diagram illustrating another configuration example of a content recommending system according to another embodiment of the present invention.

FIG. 15 is a block diagram showing another configuration example of the content recommendation system. In FIG. 15, the same configurations as the configurations shown in FIG. 11 are denoted with the same reference numerals. Redundant descriptions will be omitted as appropriate.

The content recommendation system shown in FIG. 15 is configured with the client 101 and server 131 being connected via a network such as the Internet.

The server 131 receives biometric information transmitted from multiple terminals having a configuration similar to that of the client 101, and stores and manages this in the biometric information database 141. Biometric information includes information expressing during which content playback the information is obtained.

The client 101 in FIG. 15 differs from the client 101 in FIG. 11 by further having a communication unit 121 and similar user identifying unit 122.

The communication unit 121 performs communication with the server 131, and obtains biometric information worth the multiple users other than the user of the client 101 from the biometric information database 141. The communication unit 121 stores the obtained biometric information in the biometric information database 114.

The similar user identifying unit 122 identifies a similar user which is a user exhibiting similar biometric responses as the user of the client 101 during viewing/listening to the same content, based on biometric information stored in the biometric information database 114.

That is to say, the similar user identifying unit 122 compares a time-series data pattern of the user of the client 101 and a time-series data pattern of other than the user of the client 101 and identifies a similar user.

The similar user identifying unit 122 outputs the information showing which user is the similar user to the user of the client 101, to the content group identifying unit 155.

The content group identifying unit 115 reads out the biometric information of the client 101 and the biometric information of the similar user to the user of the client 101 from the biometric information database 114, and identifies a content group wherein the users exhibit similar biometric responses during viewing/listening, based on time-series data patterns of the biometric responses expressed with the read out biometric information.

The user of the client 101 and the similar users thereof are users exhibiting similar biometric responses during viewing/listening to the same content, so even if the user of the client 101 has not viewed/listened to a certain content, such user is likely to exhibit similar biometric responses when viewing/listening to the content as the biometric responses of the similar users. Accordingly, the biometric information of the similar users is used as biometric information of the user of the client 101, whereby a content group as described above can be identified.

Figure 16:
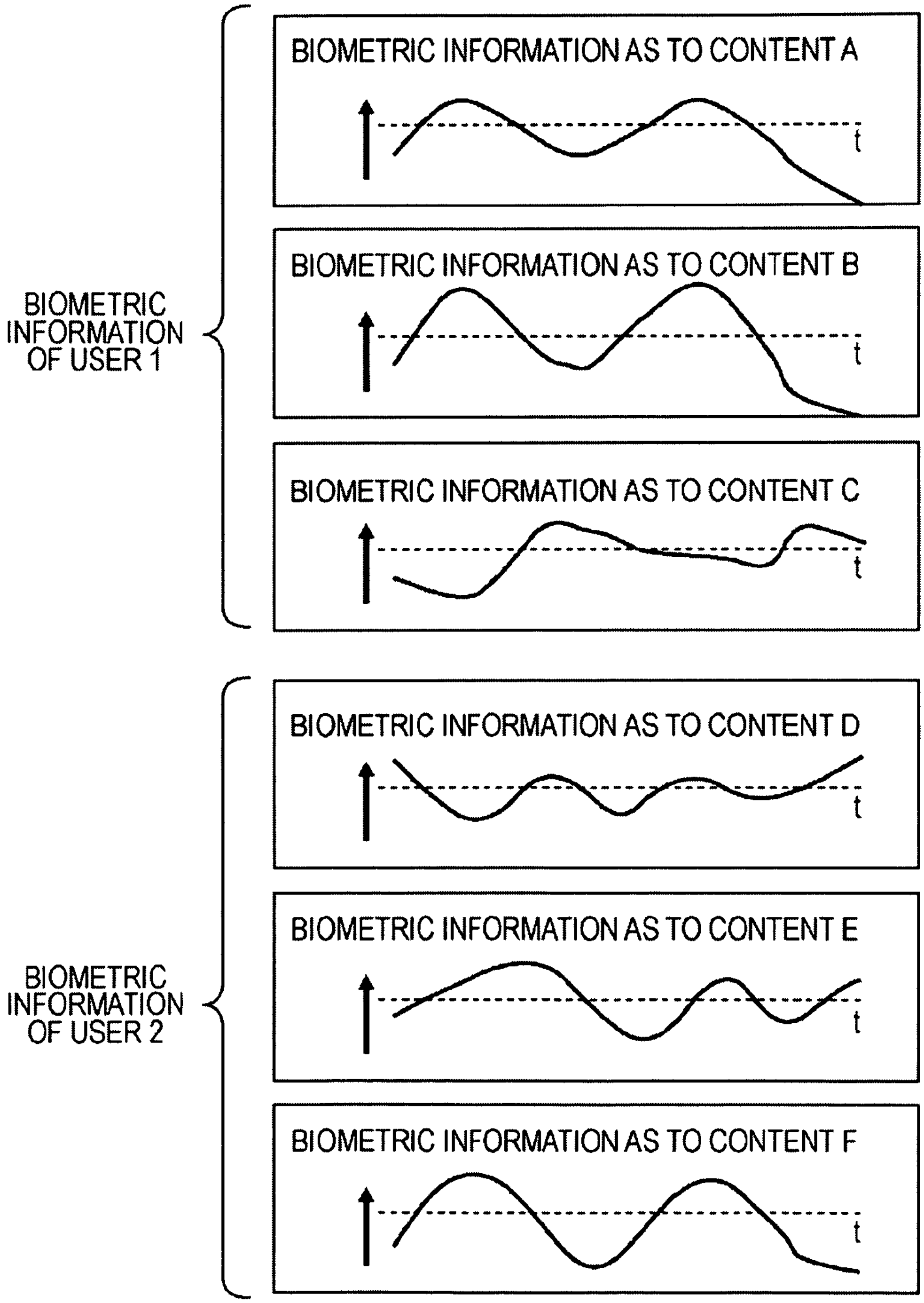
FIG. 16 is a diagram illustrating an example of time-series data of a biometric response.

FIG. 16 is a diagram showing an example of biometric information of the user 1 which is the user of the client 101 and the biometric information of the user 2 which is a similar user.

With the example in FIG. 16, the time-series data patterns of biometric responses as to contents A through F are shown in sequence from the top.

The time-series data patterns of biometric responses as to the contents A through C are expressed with biometric information obtained when the user 1 actually views/listens to the contents A through C. On the other hand, the time-series data patterns of biometric responses as to the contents D through F are expressed with biometric information of the user 2, obtained from the server 131.

In this case, the time-series data pattern of biometric responses of the user 1 while viewing/listening to contents A and B, and the time-series data pattern of biometric responses of the user 2 which is a similar user to the user 1 while viewing/listening to content F, the contents A, B, and F become a similar content group.

The content group identifying unit 115 outputs the information of the similar content group thus identified to the recommended content identifying unit 116. With the recommended content identifying unit 116, the content belonging to the same similar content group as the content serving as a standard, is selected as recommended content.

Figure 17:
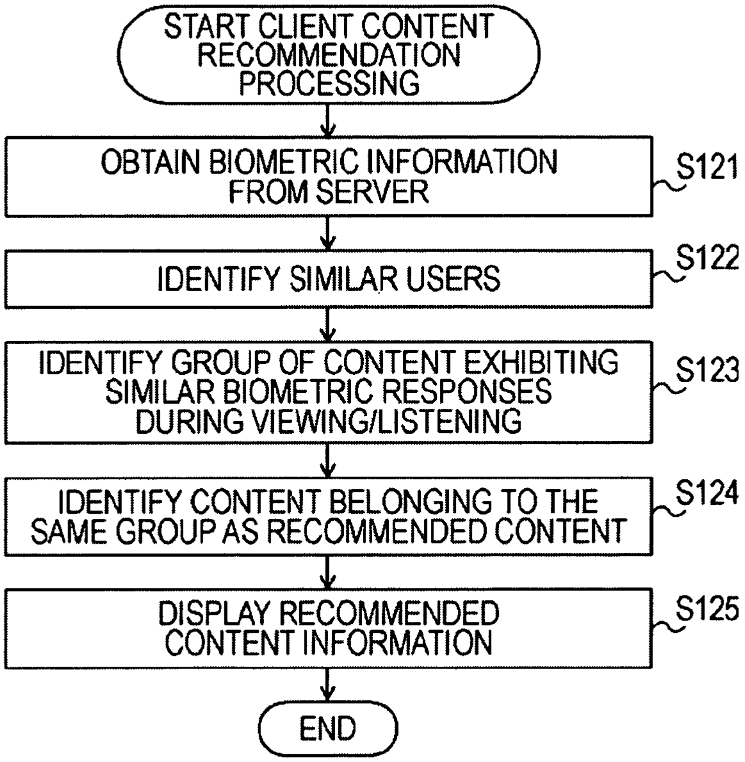
FIG. 17 is a flowchart describing content recommending processing of a client.

Processing of the client 101 having a configuration as shown in FIG. 15 will be described with reference to the flowchart in FIG. 17.

In step S121, the communication unit 121 performs communication with the server 131, and obtains biometric information worth the multiple users other than the user of the client 101.

In step S122, the similar user identifying unit 122 identifies similar users based on the biometric information of the user of the client 101 and the biometric information of users other than the user of the client 101, obtained with the communication unit 121.

Figure 14:
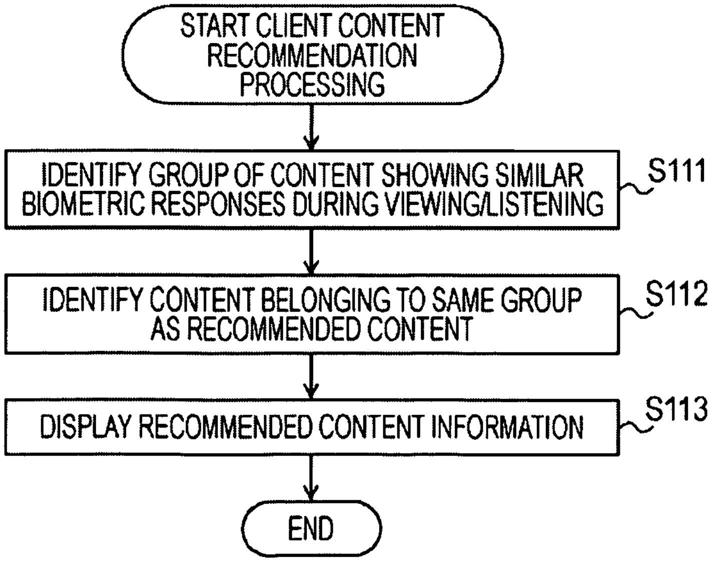
FIG. 14 is a flowchart describing content recommending processing of a client.

The processing of step S123 and thereafter is the same as the processing of step S111 in FIG. 14 and thereafter. In step S123, the content group identifying unit 115 identifies a similar content group based on the time-series data pattern of the biometric responses of the user of the client 1 and the time-series data pattern of the biometric responses of the similar users.

When content recommendation is requested by the user, in step S124, the recommended content identifying unit 116 identifies a content belonging to the same similar content group as the content serving as a standard, as the recommended content.

In step S125, the content recommending unit 117 displays the recommended content information and presents this to the user. After this, the processing is ended.

With the above-described processing, even in the case that biometric information of the user of the client 101 is insufficient, the client 101 can appropriately perform content recommendation.

Figure 18:
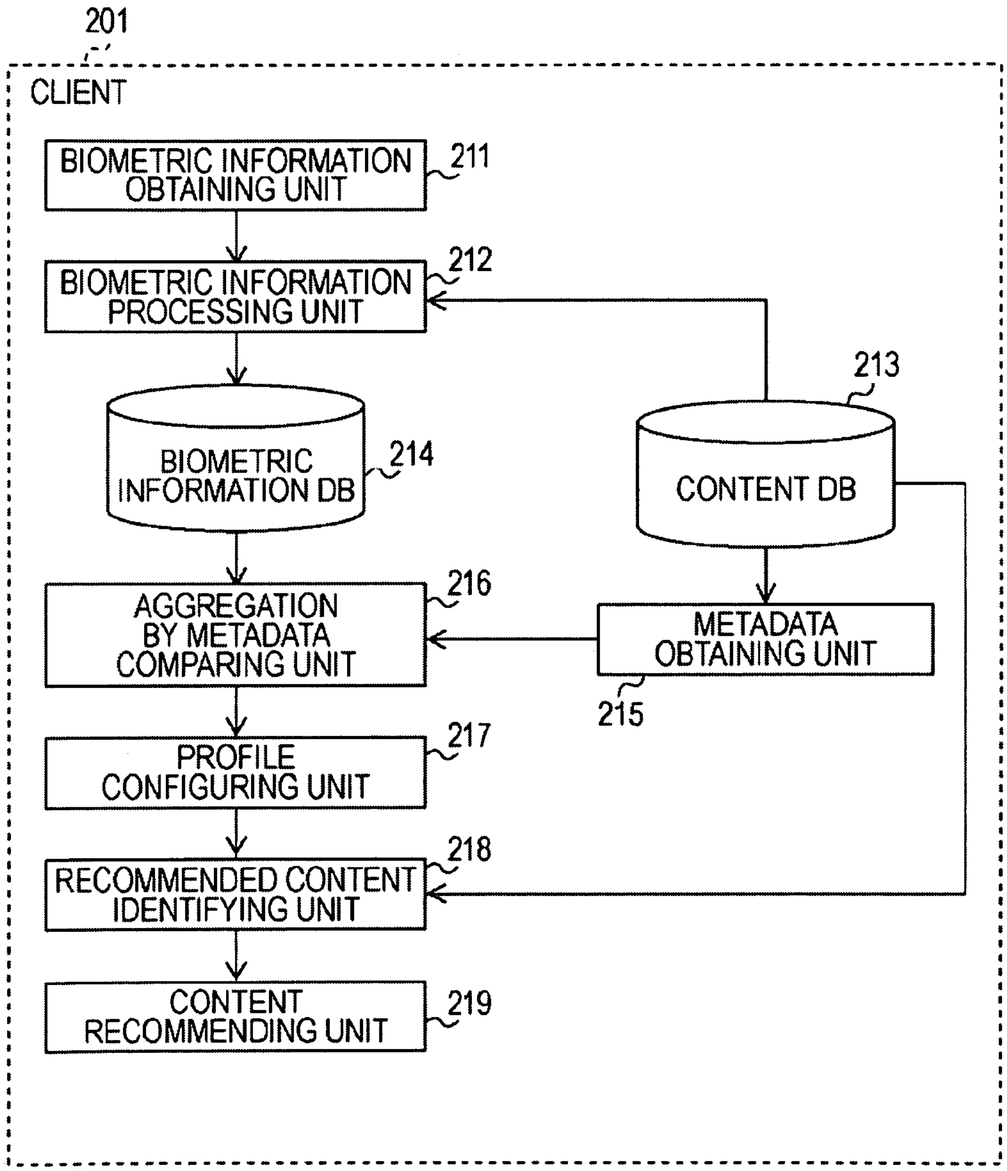
FIG. 18 is a block diagram illustrating a configuration example of a content recommending system according to yet another embodiment of the present invention.

FIG. 18 is a block diagram showing a configuration example of a content recommendation system according to yet another embodiment of the present invention. As shown in FIG. 18, the content recommending system herein is realized with the client 201.

The client 201 is made up of a biometric information obtaining unit 211, biometric information processing unit 212, content database 213, biometric information database 214, metadata obtaining unit 215, aggregation by metadata comparing unit 216, profile configuring unit 217, recommended content identifying unit 218, and content recommending unit 219.

As described later, of various types of attribute values added to the content as metadata, an attribute value that the user of the client 1 does not need to distinguish is identified with the client 201 based on biometric information. Also, a profile is reconfigured by the identified attribute values being merged, and content recommendation is performed based on the reconfigured profile.

That is to say, the client 201 is a device to perform CBF (Content Based Filtering) which is filtering based on what is in the content.

If the subject content is music content, the attributes are items used to express content features, such as genre, tempo, speed, rhythm, whether or not there are lyrics, name of singer, name of composer, and so forth.

Attribute values are values set for each item, and for example values as to a genre attribute can be set as country, jazz, pop, classical, and so forth.

A profile is information obtained by analyzing the metadata of the content that the user has actually viewed/listened to. For example, information expressing that the user has listened to content wherein the genre is "country" 10 times, or information expressing that the user has listened to content wherein the genre is "pop" 10 times, is included in the profile.

Various types of attribute values are set as metadata in each content stored in the content database 213 that the client 201 has.

Also, a profile of the user of the client 201 is managed with the profile configuring unit 217. The profile that the profile configuring unit 217 manages is updated every time an operation using the contents is performed, such as the user viewing/listening or copying the content.

The biometric information obtaining unit 211 of the client 201 obtains biometric information which is time-series data of the biometric response of the user viewing/listening to the content during playback of content such as music.

Biometric responses here include the amount of hemoglobin included in the blood, blood flow amount, sweat amount, pulse, and so forth. Any biometric responses may be used as long as the response can be exhibited by a user viewing/listening to content.

The biometric information obtaining unit 211 outputs the biometric information to the biometric information processing unit 212. Multiple contents are played back with the client 201 by metadata attribute value, and biometric information which is time-series data such as that shown in FIG. 3 is obtained for each played-back content.

The biometric information processing unit 212 reads out and plays back the content stored in the content database 213. The biometric information processing unit 212 obtains biometric information sequentially supplied from the biometric information obtaining unit 211 during content playback, and stores this in the biometric information database 214. By multiple content playback being performed, biometric information of the user of the client 201 as to each of the played-back content is stored in the biometric information database 214.

The metadata obtaining unit 215 reads out the metadata of the content subjected to playback and biometric information obtained, from the content database 213, and outputs the read out metadata to the aggregation by metadata comparing unit 216. Various types of information relating to the content are stored in the content database 213. An arrangement may also be made wherein metadata is obtained with the metadata obtaining unit 215 from the server managing the content metadata.

The aggregation by metadata comparing unit 216 compares the time-series data patterns of the biometric responses for each content having difference attribute values, and extracts a pattern featured by identified attribute values. If the extracted patterns appear to be similar between differing attribute values, the aggregation by metadata comparing unit 216 learns an attribute value which the user of the client 201 does not need to distinguish, so that the different attribute values become the same attribute value.

Specifically, the aggregation by metadata comparing unit 216 identifies the biometric information stored in the biometric information database 214 and the attributes linked to the biometric information based on the metadata supplied from the metadata obtaining unit 215. Next, the aggregation by metadata comparing unit 216 identifies an attribute value which the user of the client 201 does not need to distinguish from the attribute values set as values of identified attributes.

Now, a manner of identifying an attribute value which the user of the client 201 does not need to distinguish will be described with reference to FIGS. 19 and 20.

Figure 19:
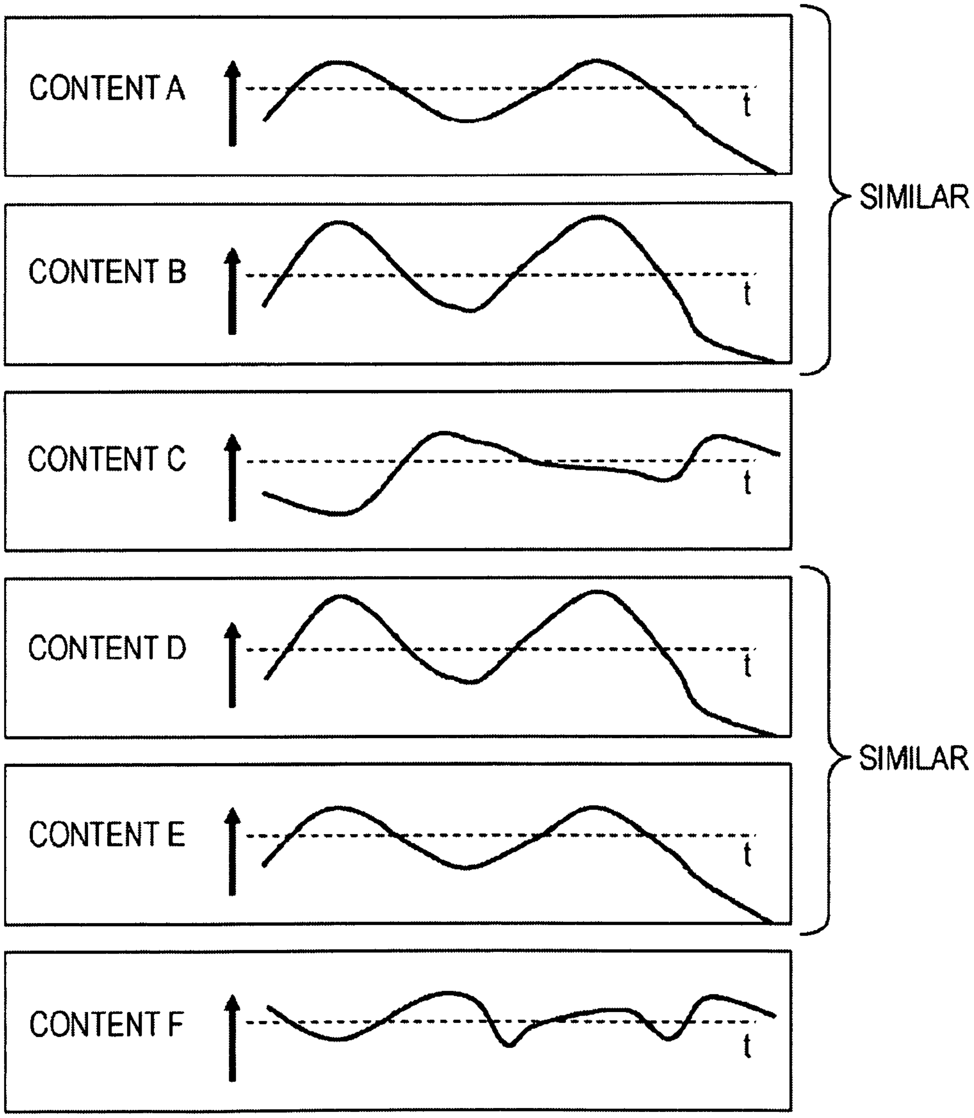
FIG. 19 is a diagram illustrating an example of time-series data of a biometric response.

FIG. 19 is a diagram showing an example of biometric information of the user of the client 201. In the example in FIG. 19, the time-series data patterns of biometric responses as to contents A through F are shown in sequence from the top. Let us say that the time-series data patterns of biometric responses as to contents A, B, D, and E are mutually similar.

Whether or not the time-series data patterns of biometric responses are similar, and as to which contents, can be determined, for example, by finding a correlation between patterns in time-series data, or finding the rate of matching with a specific pattern, or finding the rate of matching as to a threshold of a specific portion, with the metadata comparing unit 216.

FIG. 20 is a diagram showing an example of the metadata of the contents A through F. In the example in FIG. 20, the values of the attributes of with/without lyrics and speed are shown. The genre of the content A is "country", with/without lyrics is "with lyrics", and speed is "fast". A circle being set as the attribute value for with/without lyrics represents "with", and an empty cell represents "without".

Similarly, for the content B, the genre is "country", with/without lyrics is "without", and speed is "medium", and for the content C, the genre is "jazz", with/without lyrics is "with", and speed is "slow". For the content D, the genre is "pop", with/without lyrics is "with", and speed is "slow", and for the content E, the genre is "pop", with/without lyrics is "without", and speed is "medium". For the content F, the genre is "classical", with/without lyrics is "with", and speed is "fast".

In the case that such biometric information and metadata are obtained, time-series data patterns of the biometric information are compared with the aggregation by metadata comparing unit 216, and a genre is identified as an attribute linked to the biometric information.

That is to say, if we say that the attribute of with/without lyrics is linked to the biometric information, the time-series data pattern of biometric information as to the content A wherein the attribute value of with/without lyrics is "with", and the time-series data pattern of biometric information as to the content B wherein the attribute value is "without", the patterns would not be expected to be similar, but in actuality as shown in FIG. 19, the time-series data patterns of biometric information as to the contents herein are similar.

Also, if we say that the time-series data pattern of biometric information as to the content A wherein the attribute value of with/without lyrics is "with", and the time-series data pattern of biometric information as to the content C wherein the attribute value is also "with", the patterns would be expected to be similar, but in actuality as shown in FIG. 19, the time-series data patterns of biometric information as to the contents herein are not similar. Therefore, we can see that the attribute of with/without lyrics is not linked to the biometric information.

Similarly, if we say that the attribute of speed is linked to the biometric information, the time-series data pattern of biometric information as to the content A wherein the attribute value of speed is "fast", and the time-series data pattern of biometric information as to the content D wherein the attribute value is "slow", the patterns would not be expected to be similar, but in actuality as shown in FIG. 19, the time-series data patterns of biometric information as to the contents herein are similar.

Also, if we say that the time-series data pattern of biometric information as to the content A wherein the attribute value of speed is "fast", and the time-series data pattern of biometric information as to the content F wherein the attribute value is also "fast", the patterns would be expected to be similar, but in actuality as shown in FIG. 19, the time-series data patterns of biometric information as to the contents herein are not similar. Therefore, we can see that the attribute of speed is also not linked to the biometric information.

On the other hand, if we focus on the attribute of genre, for example with the time-series data pattern of biometric information as to the content A wherein the attribute value of genre is "country", and the time-series data pattern of biometric information as to the content B wherein the attribute value is also "country", the patterns are similar, as shown in FIG. 19.

Also, with the time-series data pattern of biometric information as to the content D wherein the attribute value of genre is "pop", and the time-series data pattern of biometric information as to the content E wherein the attribute value is also "pop", the patterns are similar, as shown in FIG. 19.

With the time-series data pattern of biometric information as to the content A wherein the attribute value of genre is "country", and the time-series data pattern of biometric information as to the content C wherein the attribute value is "jazz", the patterns are not similar, as shown in FIG. 19. Thus, we can see that the set value of the attribute of genre influences the biometric information, and is linked to the biometric information.

The biometric information expresses the manner of viewing/listening to content, whereby the user of the client 201 views/listens in a different manner for different genres, and the user views/listens in the same manner for the same genre.

Thus, upon the attribute linked to the biometric information being identified, an attribute value that the user of the client 201 does not need to distinguish from the attribute values set as attribute values linked to the biometric information is identified with the aggregation by metadata comparing unit 216.

In the case that the biometric information as shown in FIG. 19 and the metadata as shown in FIG. 20 are obtained, the attribute values of "country" and "pop", which are set as genre values of attributes linked to the biometric information, are identified as attribute values that the user of the client 201 does not need to distinguish.

That is to say, as described above, the biometric information expresses the manner of viewing/listening to content, whereby the user of the client 201 views/listens in a different manner for different genres, and the user views/listens in the same manner for the same genre.

Accordingly, contents A and B and contents D and E have the different genres of "country" and "pop", so the user of the client 201 would be expected to view/listen in a different manner, and hence the time-series data patterns of the biometric responses would also be expected to be detected as different, but the time-series data patterns of the biometric responses as to the contents A and B, and the time-series data patterns of the biometric responses as to the contents D and E are mutually similar as shown in FIG. 19.

This shows that the user of the client 201 does not distinguish between the "country" content and the "pop" content, and that from the perspective of the client 201, separating and setting the genre attribute values as "country" and "pop" is meaningless.

The aggregation by metadata comparing unit 216 identifies "country" and "pop" as attribute values that the user of the client 201 does not need to distinguish, and outputs the information expressing the identified attribute values to the profile configuring unit 217.

It goes without saying that depending on the time-series data pattern of the biometric responses, not only the two attribute values of "country" and "pop", but a greater number of attribute values may be identified as attribute values not needing to be distinguished.

In the case that multiple users use the client 201, obtaining the biometric information and identifying the attribute values which doe not need to be distinguished is performed for each user.

The profile configuring unit 217 merges the attribute values identified by the aggregation by metadata comparing unit 216 as the same attribute value and reconfigures the profile.

In the case that the attribute values of "country" and "pop" do not need to be distinguished, when the information expressing that the user has listened to content wherein the genre is "country" 10 times and the information expressing that the user has listened to content wherein the genre is "pop" 10 times is included in the profile before reconfiguring, the profile configuring unit 217 may summarize the information thereof as information expressing that the user has listened to "country/pop" content 20 times, for example, and reconfigures the profile.

The profile configuring unit 217 outputs the reconfigured profile in the recommended content identifying unit 218.

The recommended content identifying unit 218 identifies recommended content based on the profile reconfigured with the profile configuring unit 217.

For example, in the case that information expressing that the user has listened to "jazz" content 15 times besides the information expressing that the user has listened to "country/pop" 20 times is included in the profile, the recommended content identifying unit 218 recognizes that the user of the client 201 prefers the "country" content and the "pop" content more than the "jazz" content, and identifies the "country" content and the "pop" content as the recommended content.

In the case that reconfiguration is not performed, information expressing that the user has listened to the "country" content 10 times and information expressing that the user has listened to the "pop" content 10 times is separately included in the profile, the recommended content identifying unit 218 does not recognize that the user of the client 201 prefers the "country" content and the "pop" content more than the "jazz" content.

The "country" content and the "pop" content are not distinguished among the users of the client 201, so in the case that each content is listened to 10 times, based on the number of times of listening, the "country" content and the "pop" content match the user preference more than the "jazz" content does.

The recommended content identifying unit 218 reads out the title, sales source, overview and so forth of the recommended content from the content database 213, and outputs the read out information to the content recommending unit 219. Various types of information relating to the content are stored in the content database 213.

The content recommending unit 219 displays the recommended content information based on the information supplied from the recommended content identifying unit 218, and presents this to the user.

Figure 21:
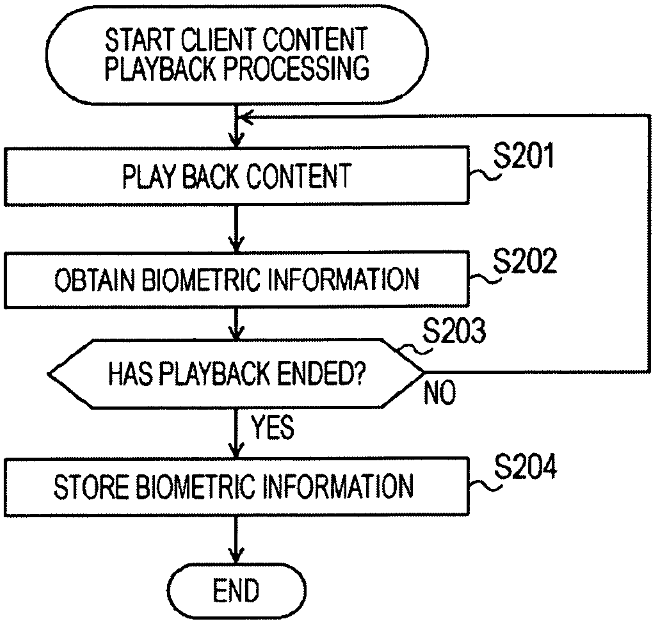
FIG. 21 is a flowchart describing content playback processing of a client.

Processing of the client 201 having a configuration as described above will be described. First, processing of the client 201 playing back the content will be described with reference to the flowchart in FIG. 21. The processing is started for example when playback of a predetermined content is instructed by the user.

In step S201, the biometric information processing unit 212 of the client 201 plays back the content read out from the content database 213.

In step S202, the biometric information obtaining unit 211 obtains biometric information serving as time-series data of the biometric responses of the user viewing/listening to the content, based on the output from the measuring device mounted on the user, and outputs this to the biometric information processing unit 212.

In step S203, the biometric information processing unit 212 determines whether or not content playback has ended, and in the case determination is made of not ended, the flow is returned to step S201 and the above processing is repeated.

On the other hand, in the case determination is made in step S203 that content playback is ended, in step S204 the biometric information processing unit 212 stores the biometric information to the biometric information database 214. After this, the processing is ended.

Figure 22:
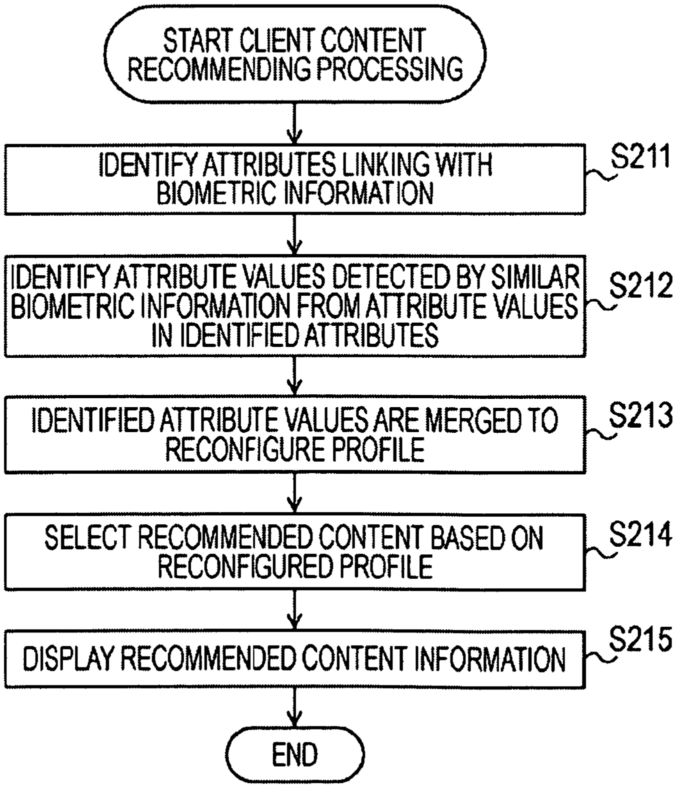
FIG. 22 is a flowchart describing content recommending processing of a client.

Next, processing of the client 201 to perform content recommending will be described with reference to the flowchart in FIG. 22.

In step S211, the aggregation by metadata comparing unit 216 identifies the attributes linked to the biometric information as described above, based on the metadata supplied from the metadata obtaining unit 215.

In step S212, the aggregation by metadata comparing unit 216 identifies attribute values of similar time-series data patterns of biometric responses, as attribute values that the user of the client 201 does not need to distinguish, of the attribute values set as the identified attribute values.

In step S213, the profile configuring unit 217 merges the attribute values that the user of the client 201 does not need to distinguish, which are identified by the aggregation by metadata comparing unit 216 and reconfigures the profile.

In step S214, the recommended content identifying unit 218 identifies recommended content based on the profile reconfigured by the profile configuring unit 217.

In step S215, the content recommending unit 219 displays the recommended content information, and presents this to the user. After this the processing is ended.

With the above-described processing, the client 201 can reconfigure the profile by handling the attribute values as the same, according to whether or not the attribute values are distinguished among the users, and can perform content recommendation.

Note that an arrangement may be made wherein the content database 213 and biometric information database 214 are connected with the client 201 via the server.

Also, an arrangement may be made wherein the expressions of the user during content viewing/listening as described above are recognized, and the relation between a identified expression such as smiling, and the metadata set in a content scene in the event such expression is exhibited during playback being performed, can be learned. Thus, using CBF, when a certain expression is detected, searching for and recommending a program scene where a similar expression is likely to be exhibited can be performed.

The above-described series of processing can be executed with hardware and can also be executed with software. In the case of executing the series of processing with software, the program making up such software is installed from a program recording medium into a computer built into dedicated hardware or a general-use personal computer that can execute various types of functions by installing various types of programs.

Figure 23:
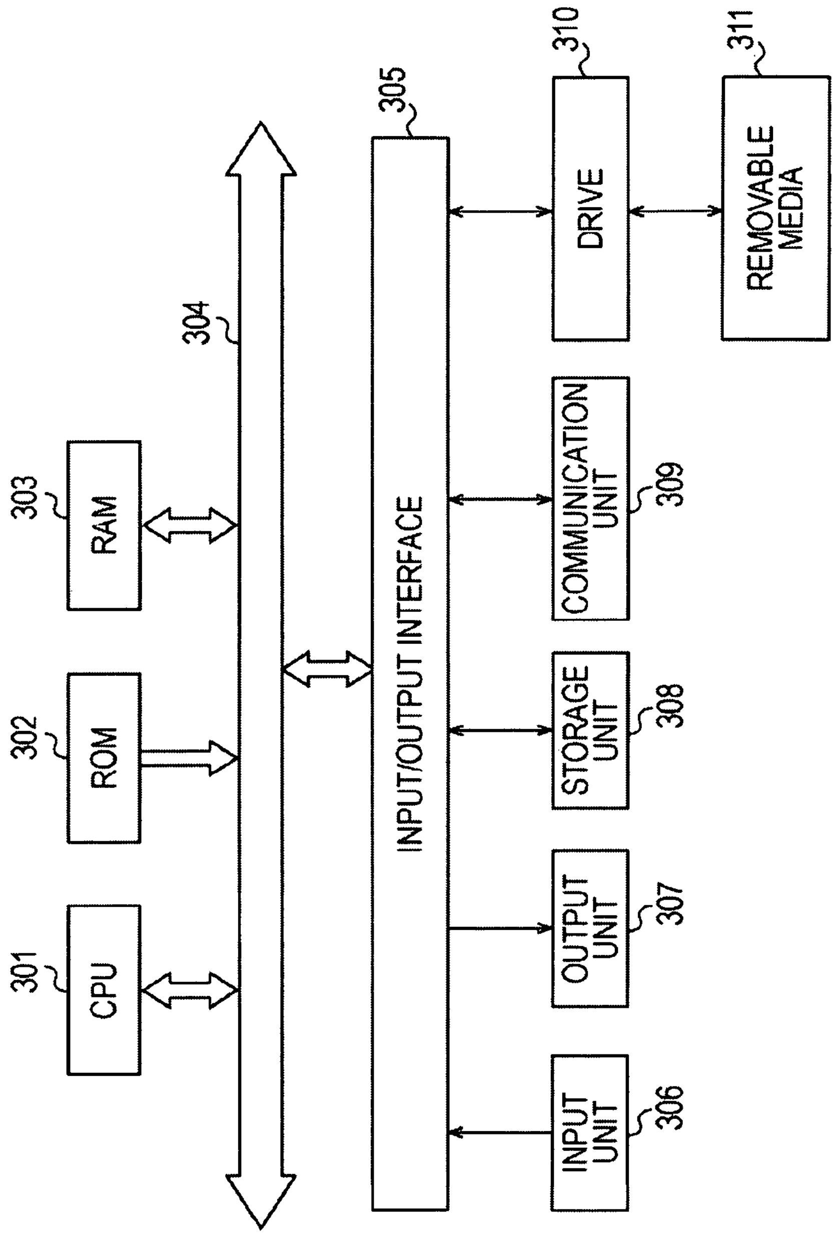
FIG. 23 is a block diagram illustrating a hardware configuration example of a computer.

FIG. 23 is a block diagram showing a hardware configuration example of a computer executing the above-described series of processing with a program. At least a portion of the configuration of the client 1 and server 2 shown in FIG. 1, the client 101 shown in FIGS. 11 and 15, the server 131 shown in FIG. 15, and the client 201 shown in FIG. 18 can be realized by predetermined programs being executed by a CPU (Central Processing Unit) 301 of a computer having a configuration such as shown in FIG. 23.

The CPU 301, ROM (Read Only Memory) 302, and RAM (Random Access Memory) 303 are mutually connected by a bus 304. The bus 304 is further connected to an input/output interface 305. The input/output interface 305 is connected to an input unit 306 made up of a keyboard, mouse, microphone, and so forth, an output unit 307 made up of a display, speaker, and so forth, a storage unit 308 made up of a hard disk or non-volatile memory and so forth, a communication unit 309 made up of a network interface and so forth, and a drive 310 to drive a removable media 311 such as an optical disk or semiconductor memory.

With a computer thus configured, for example the CPU 301 loads in the RAM 303 and executes the program stored in the storage unit 308 via the input/output interface 305 and bus 304, whereby the above-described series of processing can be performed.

The program that the CPU 301 executes is recorded on a removable media 311, for example, or provided via a cable or wireless transfer medium such as a local area network, the Internet, or a digital broadcast, and is installed in the storage unit 308. The program that the computer executes may be a program wherein processing is performed in a time-series matter along the sequences described in the present identification, or may be a program wherein processing is performed in parallel, or with timing necessary to perform when called for.

The embodiments of the present invention are not restricted to the above-described embodiments, and various types of modifications can be made within the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information terminal comprising:

biometric information obtaining means configured to obtain biometric information expressing biometric responses exhibited by a user during content playback;

metadata obtaining means configured to obtain metadata of each content of which biometric information is obtained by said biometric information obtaining means;

identifying means configured to identify attributes linked to the biometric information within attributes included in the metadata obtained by said metadata obtaining means and identify, in the case of content wherein identified attribute values differ but the user exhibits similar biometric responses during playback, the different attribute value linked to the biometric information;

wherein the identified different attribute value is set as a value not to be distinguished;

user profile managing means configured to merge information relating to the value which is identified by said identifying means and which is not to be distinguished, from information included in a user profile, to reconfigure the user profile;

recommended content identifying means configured to identify recommended content based on the user profile reconfigured by said user profile managing means; and recommending means configured to present the recommended content information identified by said recommended content identifying means to the user.

2. An information processing method comprising the steps of:

obtaining biometric information expressing biometric responses exhibited by a user during content playback;

obtaining metadata of each content of which biometric information is obtained;

identifying attributes linked to the biometric information within attributes included in the obtained metadata and identifying, in the case of content wherein identified attribute values differ but the user exhibits similar biometric responses during playback, the different attribute value linked to the biometric information;

wherein the identified different attribute value is set as a value not to be distinguished;

reconfiguring a user profile by merging information relating to the value which is not to be distinguished, from the information included in the user profile;

identifying recommended content based on the reconfigured user profile; and presenting the identified recommended content information to the user.

3. A non-transitory computer-readable medium storing a computer program that, when executed, causes a computer to execute processing comprising the steps of:

obtaining biometric information expressing biometric responses exhibited by a user during content playback;

obtaining metadata of each content of which biometric information is obtained;

identifying attributes linked to the biometric information within attributes included in the obtained metadata and identifying, in the case of content wherein identified attribute values differ but the user exhibits similar biometric responses during playback, the different attribute value linked to the biometric information;

wherein the identified different attribute value is set as a value not to be distinguished;

reconfiguring a user profile by merging information relating to the value which is identified and not to be distinguished, from the information included in the user profile;

identifying recommended content based on the reconfigured usr profile; and presenting the identified recommended content information to the user.

4. An information terminal comprising:

a biometric information obtaining unit configured to obtain biometric information expressing biometric responses exhibited by a user during content playback;

a metadata obtaining unit configured to obtain metadata of each content of which biometric information is obtained by said biometric information obtaining unit;

an identifying unit configured to identify attributes linked to the biometric information within attributes included in the metadata obtained by said metadata obtaining unit and identify, in the case of content wherein identified attribute values differ but the user exhibits similar biometric responses during playback, the different attribute value linked to the biometric information;

wherein the identified different attribute value is set as a value not to be distinguished;

a user profile managing unit configured to merge information relating to the value which is identified by said identifying means and which is not to be distinguished, from information included in a user profile, to reconfigure the user profile;

a recommended content identifying unit configured to identify recommended content based on the profile reconfigured by said user profile managing unit; and a recommending unit configured to present the recommended content information identified by said recommended content identifying unit to the user.

* * * * *